(12) United States Patent
Nakanishi et al.

(10) Patent No.: US 6,642,320 B2
(45) Date of Patent: Nov. 4, 2003

(54) MULTI-FUNCTIONAL CEMENT DISPERSANTS AND HYDRAULIC CEMENT COMPOSITIONS

(75) Inventors: Hiroshi Nakanishi, Sakura (JP); Masaki Ishimori, Sakura (JP); Minoru Yaguchi, Chigasaki (JP); Takumi Sugamata, Chigasaki (JP); Tomomi Sugiyama, Chigasaki (JP); Mitsuo Kinoshita, Gamagori (JP); Shinji Tamaki, Gamagori (JP)

(73) Assignees: Taiheiyo Cement Kabushiki Kaisha, Tokyo (JP); NMB Co., Ltd., Tokyo (JP); Takemoto Yushi Kabushiki Kaisha, Aichi (JP)

( * ) Notice: Subject to any disclaimer, the term of this patent is extended or adjusted under 35 U.S.C. 154(b) by 0 days.

(21) Appl. No.: 10/180,955

(22) Filed: Jun. 24, 2002

(65) Prior Publication Data

US 2003/0055180 A1 Mar. 20, 2003

(51) Int. Cl.[7] .................................................. C08F 8/14
(52) U.S. Cl. ........................ 525/327.7; 106/728; 524/5; 525/384
(58) Field of Search .............................. 525/327.7, 384; 524/5; 106/728

(56) References Cited

U.S. PATENT DOCUMENTS

| | | | | | |
|---|---|---|---|---|---|
| 5,158,996 | A | * | 10/1992 | Valenti | 524/5 |
| 5,391,632 | A | * | 2/1995 | Krull et al. | 525/327.6 |
| 5,798,425 | A | * | 8/1998 | Albrecht et al. | 526/271 |
| 5,912,284 | A | * | 6/1999 | Hirata et al. | 524/5 |

\* cited by examiner

Primary Examiner—Bernard Lipman
(74) Attorney, Agent, or Firm—Beyer Weaver & Thomas LLP

(57) ABSTRACT

A multi-functional cement dispersant contains a graft copolymer obtained by a graft reaction of one or more selected from polyoxyalkylene monoalkylester, polyoxyalkylene monoalkylether and polypropyleneglycol of specified kinds to a copolymer obtained by radical polymerization of a mixture of radical polymerizable monomers containing maleic anhydride and monomers of a specified kind at a specified ratio. Hydraulic cement compositions produced with such a multi-functional cement dispersant have a superior fluidity with reduced loss over time and hardened objects produced from such a composition exhibit a superior early strength and have a low dry shrinkage and a high resistance against freezing and thawing.

30 Claims, No Drawings

MULTI-FUNCTIONAL CEMENT DISPERSANTS AND HYDRAULIC CEMENT COMPOSITIONS

TECHNICAL FIELD OF THE INVENTION

This invention relates to multi-functional cement dispersants and hydraulic cement compositions. Hydraulic cement compositions such as mortar and concrete are required to have several characteristics simultaneously. Not only should they have a superior fluidity, but it should not deteriorate quickly over the time, and hardened objects obtained therefrom should have a superior early strength, a small dry shrinkage ratio and a high resistance against freezing and thawing. This invention relates to multi-functional cement dispersants capable of providing such multiple functions simultaneously to hydraulic cement compositions, as well as hydraulic cement compositions possessing such multiple functions simultaneously.

BACKGROUND OF THE INVENTION

Many kinds of compounds of polycarboxylic acid have been known as a cement dispersant capable of providing hydraulic cement compositions with superior fluidity which does not deteriorate over the time (U.S. Pat. Nos. 4,471,100 and 4,962,173, EPA 753,488, and Japanese patents 2507280, 2541218 and 2676854). These prior art cement dispersants were not satisfactory because they were not sufficiently effective in reducing the dry shrinkage of hardened objects obtained therefrom and in providing resistance to such hardened objects against freezing and thawing. Many kinds of agents for reducing dry shrinkage for use with hydraulic cement compositions have also been known (U.S. Pat. No. 4,547,223, Japanese Patent Publications Tokko 56-51148 and 6-6500) and are being used together with such compounds of polycarboxylic acid as mentioned above in order to improve conditions when they are used as cement dispersant. In such applications, however, the work of preparing hydraulic cement composition becomes complicated and the quality control becomes difficult. If it is attempted to obtain a practical effect in reducing dry shrinkage, it is necessary to add a large amount of such an agent and this affects the cost of production, but there still remains the problem of low efficiency in providing resistance against freezing and thawing to hardened objects. Although cement dispersants with the effect of reducing dry shrinkage of hardened objects have been known (Japanese Patent Publications Tokkai 8-268741 and 2000-34151), such prior art cement dispersants have the problems such that hardened objects obtained therewith do not show early strength and are still not sufficiently effective in providing hardened objects with resistance against freezing and thawing.

SUMMARY OF THE INVENTION

The problem for the invention is to provide multi-functional cement dispersants such that hydraulic cement compositions produced therewith have a superior fluidity which does not deteriorate over the time and hardened objects obtained therefrom have a superior early strength, a low dry shrinkage and a high resistance against freezing and thawing.

The invention is based on the discovery by the present inventors as a result of their diligent researches in view of the object described above that graft copolymers of a certain kind or their salts should be used.

The invention relates to multi-functional cement dispersants characterized as comprising graft copolymers obtained by the following two steps which are herein referred to as the "first step" and the "second step". The first step is a step of obtaining copolymers with average numerical molecular weight 3000–50000 by radical polymerization of a mixture of radical polymerizable monomers containing maleic anhydride and monomers of the form given by Formula 1 given below, together in an amount of 85 molar % or more of the mixture and at molar ratio of 50/50–80/20, Formula 1 being:

$$CH_2=CH-CH_2-O-A-O-R \qquad \text{(Formula 1)}$$

where R is acyl group with 1–18 carbon atoms, alkyl group with 1–3 carbon atoms or hydrogen, and A is a residual group obtained by removing all hydroxyl groups from polyalkylene glycol with repetition number of oxyalkylene units equal to 5–80, the oxyalkylene units consisting only of oxyethylene units or of both oxyethylene units and oxypropylene units.

The second step is a step of obtaining the graft copolymers by a graft reaction, in the presence of a basic catalyst, of 100 weight parts of the copolymers obtained in the first step and 3–35 weight parts of one or more selected from the group consisting of polyoxyalkylene monoalkylester (having a block addition of a total of 2–10 moles of ethylene oxide and propylene oxide to one mole of aliphatic carboxylic acid with 1–6 carbon atoms), polyoxyalkylene monoalkylether (having a block addition of a total of 2–10 moles of ethylene oxide and propylene oxide to one mole of aliphatic alcohol with 1–6 carbon atoms), and polypropyleneglycol with repetition number of oxypropylene units equal to 3–15.

The invention also relates to multi-functional cement dispersants characterized as comprising salts of graft copolymers obtained by the aforementioned two steps and also still another step which is herein referred to as the "third step" and is a step of obtaining the salts of graft copolymers by neutralizing the graft copolymers obtained in the second step with one or more selected from the group consisting of alkali metal hydroxide, alkali earth metal hydroxide and amines.

The invention further relates to hydraulic cement products characterized as being obtained by adding any of aforementioned multi-functional cement dispersants in an amount of 0.05–4.0 weight parts to 100 weight parts of cement.

In summary, multi-functional cement dispersants comprising (1) graft copolymers obtained by the aforementioned first and second steps and (2) salts of graft copolymers obtained by the aforementioned first, second and third steps are both within the scope of this invention. The first step is for obtaining copolymers by radical polymerization of a mixture of radical polymerizable monomers. According to this invention, the first step uses a mixture containing maleic anhydride and monomers of Formula 1 at a molar ratio of 50/50–80/20, and preferably 60/40–70/30.

Examples of what A may be in Formula 1 include (1) residual groups obtained by removing all hydroxyl groups from (poly)ethylene glycol of which oxyalkylene units consist only of oxyethylene units, and (2) residual groups obtained by removing all hydroxyl groups from (poly) ethylene (poly)propylene glycol of which oxyalkylene units consists of both oxyethylene units and oxypropylene units. In the case of (2), the combination of oxyethylene units and oxypropylene units may be by random addition or block addition, but (1) is preferred. The repetition number of the oxyalkylene units in A is 5–80, but it is preferably 15–70.

Examples of what R may be in Formula 1 include (1) acyl groups with 1–18 carbon atoms such as formyl group, acetyl group, propionyl group, butyryl group, isobutyryl group, valeryl group, isovaleryl group, hexanoyl group, heptanoyl group, octanoyl group, nonanoyl group, decanoyl group, hexadecanoyl group, octadecanoyl group, hexadecenoyl group and octadecenoyl group, (2) alkyl groups with 1–3 carbon atoms such as methyl group, ethyl group, propyl group and isopropyl group, and (3) hydrogen. Among these, acyl groups with 1–18 carbon atoms are preferred and acetyl group is particularly preferred.

Practical examples of monomers of Formula 1 used in the first step according to this invention include (1) α-allyl-ω-alkyloyl-(poly)oxyethylene, (2) α-allyl-ω-alkyloyl-(poly)oxyethylene (poly)oxypropylene, (3) α-allyl-ω-alkyl(with 1–3 carbon atoms)(poly)oxyethylene, (4) α-allyl-ω-alkyl (with 1–3 carbon atoms)-(poly)oxyethylene (poly)oxypropylene, (5) α-allyl-ω-hydroxy-(poly)oxyethylene, and (6) α-allyl-ω-hydroxy-(poly)oxyethylene (poly)oxypropylene.

The mixture of radical polymerizable monomers in the first step contains maleic anhydride and monomers of Formula 1 together in an amount of 85 molar % or more, and preferably 90 molar % or more. In other words, radical polymerizable monomers of other types may be contained in an amount of less than 15 molar %, or preferably less than 10 molar %. Examples of such other radical polymerizable monomers include styrene, vinyl acetate, acrylic acid, acrylic acid salts, acrylic acid alkyl esters, (meth)allyl sulfonic acid and (meth)allyl sulfonic acid salts. Among these, styrene is preferred.

In the first step, a radical initiator is added to the mixture described above to cause radical polymerization and to obtain copolymers with average numerical molecular weight (hereinafter Pullulan converted by GPC method) of 3000–50000, or preferably 5000–25000. A known method may be used for this radical polymerization such as (1) methods of radical polymerization of a mixture of radical polymerizable monomers without the use of a solvent and (2) methods of radical polymerization by dissolving a mixture of radical polymerizable monomers in a solvent such as benzene, toluene, xylene, methyl isobutyl ketone and dioxane. Of the above, methods according to (1) are preferred, and it is more preferred to obtain copolymers with average numerical molecular weight of 5000–25000 by a method of (1). A method of (1) may be carried out by placing a mixture of polymerizable monomers in a reactor can and adding a radical initiator in a nitrogen atmosphere to cause a radical polymerization reaction at 60–90° C. for 5–10 hours. In order to obtain desired copolymers by controlling the radical polymerization reaction either by a method of (1) without using a solvent or by a method of (2) by using a solvent, kinds and amounts of radical initiator and radical chain transfer agent to be used, polymerization temperature and polymerization time are appropriately selected. Examples of radical initiators that may be used in this invention include azo initiators such as azobis isobutylonitrile and 2,2'-azobis (4-methoxy-2,4-dimethylvaleronitrile) and organic peroxide initiators such as benzoyl peroxide, lauroyl peroxide and cumene hydroperoxide.

In the second step, graft copolymers are obtained by a graft reaction of one or more selected from polyoxyalkylene monoalkylester, polyoxyalkylene monoalkylether and polypropyleneglycol with the copolymers obtained in the first step. According to the present invention, what is obtained by a block addition of a total of 2–10 moles of ethylene oxide and propylene oxide to 1 mole of aliphatic carboxylic acid with 1–6 carbon atoms is used as the polyoxyalkylene monoalkylester of the second step, and what is obtained by a block addition of a total of 2–10 moles of ethylene oxide and propylene oxide to 1 mole of aliphatic alcohol with 1–6 carbon atoms is used as the polyoxyalkylene monoalkylether. As for polypropyleneglycol, examples with repetition number of oxypropylene units equal 3–15 are used.

Examples of aliphatic carboxylic acid with 1–6 carbon atoms which may be used for producing the polyoxyalkylene monoalkylester for the second step include formic acid, acetic acid, propionic acid, butyric acid, valerianic acid and caproic acid. Among these, propionic acid with 3–5 carbon atoms, butyric acid and valerianic acid are preferred. Examples of aliphatic alcohol with 1–6 carbon atoms which may be used for producing the polyoxyalkylene monoalkylether for the second step include methanol, ethanol, propanol, butanol, pentanol and hexanol. Among these, propanol with 3–5 carbons, butanol and pentanol are preferred.

The polyoxyalkylene monoalkylester to be used in the second step is, as explained above, what may be obtained by block addition of a total of 2–10 moles of ethylene oxide and propylene oxide to 1 mole of aliphatic carboxylic acid with 1–6 carbons, but what may be obtained by block addition of 1–4 moles of ethylene oxide and 1–4 moles of propylene oxide to one mole of aliphatic acid with 1–6 carbon atoms is preferred, and what may be obtained by block addition of 2–4 moles of ethylene oxide and 2–4 moles of propylene oxide to one carboxylic acid with 3–5 carbon atoms is even more preferred. The polyoxyalkylene monoalkylether to be used in the second step is, as explained above, what may be obtained by block addition of a total of 2–10 moles of ethylene oxide and propylene oxide to 1 mole of aliphatic alcohol with 1–6 carbon atoms, but what may be obtained by block addition of 1–4 moles of ethylene oxide and 1–4 moles of propylene oxide to 1 mole of aliphatic alcohol with 3–5 carbon atoms is preferred. There is no particular limitation as to the order of addition of ethylene oxide and propylene oxide to aliphatic carboxylic acid and aliphatic alcohol, but those obtained by adding propylene oxide first and then ethylene oxide are preferred. The polypropyleneglycol to be used in the second step is preferably what may be obtained by an addition of 3–15 moles, or more preferably 4–10 moles of propylene oxide. Polyoxyalkylene monoalkylester, polyoxyalkylene monoalkylether and polypropyleneglycol described above can be synthesized by a conventionally known method.

In the second step, graft copolymers are obtained by a graft reaction of 3–35 weight parts, and preferably 5–25 weight parts, of one or more of polyoxyalkylene monoalkylester, polyoxyalkylene monoalkylether and polypropyleneglycol with 100 weight parts of the copolymers obtained in the first step. A conventionally known method may be used for such a graft reaction. For example, graft copolymers can be obtained by placing the copolymers obtained in the first step, one or more selected from polyoxyalkylene monoalkylester, polyoxyalkylene monoalkylether and polypropyleneglycol, and a basic catalyst inside a reactor and carrying out a graft reaction at 100° C. for 4–6 hours after a nitrogen atmosphere is established. A conventionally known basic catalyst which is used for ring-opening esterification reactions of anhydrous acid and alcohol may be used, but amine catalysts are preferred, and lower alkylamines are particularly preferred. The viscosity of 40% aqueous solution of the obtained graft copolymer at 20° C. is preferably 60–700 MPa·s.

In the third step, salts of graft copolymers are produced by completely or partially neutralizing the graft copolymers obtained in the second step by using a basic compound.

Examples of such a basic compound include (1) alkali metal hydroxides such as sodium hydroxide and potassium hydroxide, (2) alkali earth metal hydroxides such as calcium hydroxide and magnesium hydroxide, and (3) amines such as ammonia and triethanolamine. One or more kinds of these compounds may be used.

Multi-functional cement dispersants of this invention are applicable to hydraulic cement compositions such as mortar and concrete. They are capable of not only providing them with a superior fluidity with a small loss over the time but also of producing a hardened objects of such a hydraulic cement composition having a superior early strength, a reduced dry shrinkage and a high resistance against freezing and thawing.

Next, hydraulic cement compositions embodying this invention are described. The hydraulic cement compositions embodying this invention, like other ordinary hydraulic cement compositions, include cement, aggregates and water but are characterized as containing a multi-functional cement dispersant of this invention in an amount of 0.05–4.0 weight parts, or preferably 0.1–2.0 weight parts, per 100 weight parts of cement.

Examples of cement which may be used to produce hydraulic cement compositions embodying this invention include different kinds of portland cement such as normal portland cement, high early portland cement, moderate heat portland cement and belite-rich portland cement, and different kinds of blended cement such as blast-furnace slag cement, fly ash cement and silica pozzolan cement, as well as alumina cement Powder materials such as lime stone powder, calcium carbonate, silica fume, blast-furnace slag powder and fly ash may also be used in part as a substitute for cement.

Methods of producing hydraulic cement compositions of this invention include: (1) methods of mixing cement and aggregates first and then mixing a multi-functional cement dispersant of this invention with water with kneading; (2) methods of mixing cement, aggregates and a multi-functional cement dispersant of this invention first and then adding water with kneading; and (3) methods of mixing cement, aggregates, a multi-functional cement dispersant of this invention and water simultaneously and kneading them together. The multi-functional cement dispersants of this invention may be used either as an aqueous solution or in a powder form.

Hydraulic cement compositions embodying this invention may also contain other additives such as an agent for controlling air content, a setting accelerator, a setting retarder, a thickener, a waterproofing agent, an antiseptic agent and a rust preventive as long as they have no adverse effect on the functions of the multi-functional cement dispersant. Hydraulic cement compositions of this invention have superior fluidity which is not reduced with the time and hardened objects produced therewith can exhibit a superior early strength, a low dry shrinkage and a high resistance against freezing and thawing.

EMBODIMENTS OF THE INVENTION

The following embodiments may be considered for describing the present invention:

(1) Multi-functional cement dispersant comprising graft copolymer (P-1) obtained by the first step and the second step described below:

The first step: Step of obtaining copolymers with average numeral molecular weight of 13000 by radical polymerization of a mixture of radical polymerizable monomers containing a total of 100 molar % of maleic anhydride and $\alpha$-allyl-$\omega$-acetyl-polyoxyethylene (with repetition number of oxyethylene units equal to 30, hereinafter written as n=30) at a molar ratio of 65/35.

The second step: Step of obtaining graft copolymers (P-1) by a graft reaction, in the presence of tributylamine as catalyst, of 16 weight parts of polyoxyalkylene monoalkylester having a block addition of 2 moles of ethylene oxide and 2 moles of propylene oxide per 1 mole of butyric acid to 100 weight parts of the copolymer obtained in the first step.

(2) Multi-functional cement dispersant comprising graft copolymer (P-2) obtained by the first step and the second step described below:

The first step: Step of obtaining copolymers with average numeral molecular weight of 13000 by radical polymerization of a mixture of radical polymerizable monomers containing a total of 100 molar % of maleic anhydride and $\alpha$-allyl-$\omega$-acetyl-polyoxyethylene (n=30) at a molar ratio of 65/35.

The second step: Step of obtaining graft copolymers (P-2) by a graft reaction, in the presence of tributylamine as catalyst, of 10 weight parts of polyoxyalkylene monoalkylester of aforementioned Embodiment (1) to 100 weight parts of the copolymer obtained in the first step.

(3) Multi-functional cement dispersant comprising graft copolymer (P-3) obtained by the first step and the second step described below:

The first step: Step of obtaining copolymers with average numeral molecular weight of 18500 by radical polymerization of a mixture of radical polymerizable monomers containing a total of 100 molar % of maleic anhydride and $\alpha$-allyl-$\omega$-acetyl-polyoxyethylene (n=50) at a molar ratio of 70/30.

The second step: Step of obtaining graft copolymers (P-3) by a graft reaction, in the presence of tributylamine as catalyst, of 9 weight parts of polyoxyalkylene monoalkylester of aforementioned Embodiment (1) to 100 weight parts of the copolymer obtained in the first step.

(4) Multi-functional cement dispersant comprising graft copolymer (P-4) obtained by the first step and the second step described below:

The first step: Step of obtaining copolymers with average numeral molecular weight of 8200 by radical polymerization of a mixture of radical polymerizable monomers containing a total of 100 molar % of maleic anhydride and $\alpha$-allyl-$\omega$-acetyl-polyoxyethylene (n=17) at a molar ratio of 60/40.

The second step: Step of obtaining graft copolymers (P-4) by a graft reaction, in the presence of tributylamine as catalyst, of 24 weight parts of polyoxyalkylene monoalkylester having a block addition of 2 moles of ethylene oxide and 3 moles of propylene oxide per 1 mole of propionic acid to 100 weight parts of the copolymer obtained in the first step.

(5) Multi-functional cement dispersant comprising graft copolymer (P-5) obtained by the first step and the second step described below:

The first step: Step of obtaining copolymers with average numeral molecular weight of 12700 by radical polymerization of a mixture of radical polymerizable monomers containing a total of 100 molar % of maleic anhydride and $\alpha$-allyl-$\omega$-lauroyl-polyoxyethylene (n=60) at a molar ratio of 65/35.

The second step: Step of obtaining graft copolymers (P-5) by a graft reaction, in the presence of tributylamine as catalyst, of 10 weight parts of polyoxyalkylene monoalkylester of aforementioned Embodiment (4) to 100 weight parts of the copolymer obtained in the first step.

(6) Multi-functional cement dispersant comprising graft copolymer (P-6) obtained by the first step and the second step described below:

The first step: Step of obtaining copolymers with average numeral molecular weight of 23000 by radical polymerization of a mixture of radical polymerizable monomers containing a total of 100 molar % of maleic anhydride, α-allyl-ω-acetyl-polyoxyethylene (n=50) and styrene at a molar ratio of 57/38/5.

The second step: Step of obtaining graft copolymers (P-6) by a graft reaction, in the presence of tributylamine as catalyst, of 12 weight parts of polyoxyalkylene monoalkylester of aforementioned Embodiment (4) to 100 weight parts of the copolymer obtained in the first step.

(7) Multi-functional cement dispersant comprising graft copolymer (P-7) obtained by the first step and the second step described below:

The first step: Step of obtaining copolymers with average numeral molecular weight of 19500 by radical polymerization of a mixture of radical polymerizable monomers containing a total of 100 molar % of maleic anhydride, α-allyl-ω-acetyl-polyoxyethylene (n=30) and styrene at a molar ratio of 58/37/5.

The second step: Step of obtaining graft copolymers (P-7) by a graft reaction, in the presence of tributylamine as catalyst, of 9 weight parts of polyoxyalkylene monoalkylester of aforementioned Embodiment (1) to 100 weight parts of the copolymer obtained in the first step.

(8) Multi-functional cement dispersant comprising graft copolymer (P-8) obtained by the first step and the second step described below:

The first step: Step of obtaining copolymers with average numeral molecular weight of 9000 by radical polymerization of a mixture of radical polymerizable monomers containing a total of 100 molar % of maleic anhydride, α-allyl-ω-acetyl-polyoxyethylene (n=17) and styrene at a molar ratio of 65/30/5.

The second step: Step of obtaining graft copolymers (P-8) by a graft reaction, in the presence of tributylamine as catalyst, of 18 weight parts of polyoxyalkylene monoalkylester of aforementioned Embodiment (1) to 100 weight parts of the copolymer obtained in the first step.

(9) Multi-functional cement dispersant comprising graft copolymer (P-9) obtained by the first step and the second step described below:

The first step: Step of obtaining copolymers with average numeral molecular weight of 13000 by radical polymerization of a mixture of radical polymerizable monomers containing a total of 100 molar % of maleic anhydride and α-allyl-ω-methyl-polyoxyethylene (n—35) at a molar ratio of 65/35.

The second step: Step of obtaining graft copolymers (P-9) by a graft reaction, in the presence of tributylamine as catalyst, of 14 weight parts of polyoxyalkylene monoalkylether having a block addition of 2 moles of ethylene oxide and 2 moles of propylene oxide per 1 mole of butyl alcohol to 100 weight parts of the copolymer obtained in the first step.

(10) Multi-functional cement dispersant comprising graft copolymer (P-10) obtained by the first step and the second step described below:

The first step: Step of obtaining copolymers with average numeral molecular weight of 13000 by radical polymerization of a mixture of radical polymerizable monomers containing a total of 100 molar % of maleic anhydride and α-allyl-ω-hydroxy-polyoxyethylene (n=60) polyoxypropylene (with repetition number of oxypropylene units equal to 5, hereinafter written as m=5) at a molar ratio of 68/32.

The second step: Step of obtaining graft copolymers (P-10) by a graft reaction, in the presence of tributylamine as catalyst, of 7 weight parts of polyoxyalkylene monoalkylether of aforementioned Embodiment (9) to 100 weight parts of the copolymer obtained in the first step.

(11) Multi-functional cement dispersant comprising graft copolymer (P-11) obtained by the first step and the second step described below:

The first step: Step of obtaining copolymers with average numeral molecular weight of 13000 by radical polymerization of a mixture of radical polymerizable monomers containing a total of 100 molar % of maleic anhydride and α-allyl-ω-acetyl-polyoxyethylene (n=30) at a molar ratio of 65/35.

The second step: Step of obtaining graft copolymers (P-11) by a graft reaction, in the presence of tributylamine as catalyst, of 14 weight parts of polypropyleneglycol (m=7) to 100 weight parts of the copolymer obtained in the first step.

(12) Multi-functional cement dispersant comprising graft copolymer (P-12) obtained by the first step and the second step described below:

The first step: Step of obtaining copolymers with average numeral molecular weight of 13000 by radical polymerization of a mixture of radical polymerizable monomers containing a total of 100 molar % of maleic anhydride and α-allyl-ω-acetyl-polyoxyethylene (n=30) at a molar ratio of 65/35.

The second step: Step of obtaining graft copolymers (P-12) by a graft reaction, in the presence of tributylamine as catalyst, of 20 weight parts of polypropyleneglycol of aforementioned Embodiment (11) to 100 weight parts of the copolymer obtained in the first step.

(13) Multi-functional cement dispersant comprising graft copolymer (P-13) obtained by the first step and the second step described below:

The first step: Step of obtaining copolymers with average numeral molecular weight of 13000 by radical polymerization of a mixture of radical polymerizable monomers containing a total of 100 molar % of maleic anhydride and α-allyl-ω-acetyl-polyoxyethylene (n=30) at a molar ratio of 65/35.

The second step: Step of obtaining graft copolymers (P-13) by a graft reaction, in the presence of tributylamine as catalyst, of 7 weight parts of polypropyleneglycol of aforementioned Embodiment (11) to 100 weight parts of the copolymer obtained in the first step.

(14) Multi-functional cement dispersant comprising graft copolymer (P-14) obtained by the first step and the second step described below:

The first step: Step of obtaining copolymers with average numeral molecular weight of 8200 by radical polymerization of a mixture of radical polymerizable monomers containing a total of 100 molar % of maleic anhydride and α-allyl-ω-acetyl-polyoxyethylene (n=17) at a molar ratio of 60/40.

The second step: Step of obtaining graft copolymers (P-14) by a graft reaction, in the presence of tributylamine as catalyst, of 12 weight parts of polypropyleneglycol (m=10) to 100 weight parts of the copolymer obtained in the first step.

(15) Multi-functional cement dispersant comprising graft copolymer (P-15) obtained by the first step and the second step described below:

The first step: Step of obtaining copolymers with average numeral molecular weight of 12400 by radical polymerization of a mixture of radical polymerizable monomers containing a total of 100 molar % of maleic anhydride and α-allyl-ω-acetyl-polyoxyethylene (n=50) polyoxypropylene (m=5) at a molar ratio of 70/30.

The second step: Step of obtaining graft copolymers (P-15) by a graft reaction, in the presence of tributylamine as catalyst, of 10 weight parts of polypropyleneglycol (m=4) to 100 weight parts of the copolymer obtained in the first step.

(16) Multi-functional cement dispersant comprising graft copolymer (P-16) obtained by the first step and the second step described below:

The first step: Step of obtaining copolymers with average numeral molecular weight of 19600 by radical polymerization of a mixture of radical polymerizable monomers containing a total of 100 molar % of maleic anhydride and α-allyl-ω-lauroyl-polyoxyethylene (n—60) at a molar ratio of 65/35.

The second step: Step of obtaining graft copolymers (P-16) by a graft reaction, in the presence of tributylamine as catalyst, of 23 weight parts of polypropyleneglycol of aforementioned Embodiment (11) to 100 weight parts of the copolymer obtained in the first step.

(17) Multi-functional cement dispersant comprising graft copolymer (P-17) obtained by the first step and the second step described below:

The first step: Step of obtaining copolymers with average numeral molecular weight of 22300 by radical polymerization of a mixture of radical polymerizable monomers containing a total of 100 molar % of maleic anhydride and α-allyl-ω-methyl-polyoxyethylene (n=35) at a molar ratio of 55/45.

The second step: Step of obtaining graft copolymers (P-17) by a graft reaction, in the presence of tributylamine as catalyst, of 9 weight parts of polypropyleneglycol of aforementioned Embodiment (11) to 100 weight parts of the copolymer obtained in the first step.

(18) Multi-functional cement dispersant comprising graft copolymer (P-18) obtained by the first step and the second step described below:

The first step: Step of obtaining copolymers with average numeral molecular weight of 28500 by radical polymerization of a mixture of radical polymerizable monomers containing a total of 100 molar % of maleic anhydride, α-allyl-ω-acetyl-polyoxyethylene (n=30) and styrene at a molar ratio of 60/35/5.

The second step: Step of obtaining graft copolymers (P-18) by a graft reaction, in the presence of tributylamine as catalyst, of 18 weight parts of polypropyleneglycol of aforementioned Embodiment (11) to 100 weight parts of the copolymer obtained in the first step.

(19) Multi-functional cement dispersant comprising salt (P-19) of graft copolymer obtained by the first step and the second step of aforementioned Embodiment (1) and the third step described below:

The third step: Step of obtaining salt (P-19) of copolymer by partially neutralizing graft copolymer (P-1) obtained in the second step with sodium hydroxide.

(20) Multi-functional cement dispersant comprising salt (P-20) of graft copolymer obtained by the first step and the second step of aforementioned Embodiment (3) and the third step described below:

The third step: Step of obtaining salt (P-20) of copolymer by partially neutralizing graft copolymer (P-3) obtained in the second step with sodium hydroxide.

(21) Multi-functional cement dispersant comprising salt (P-21) of graft copolymer obtained by the first step and the second step of aforementioned Embodiment (6) and the third step described below:

The third step: Step of obtaining salt (P-21) of copolymer by partially neutralizing graft copolymer (P-6) obtained in the second step with sodium hydroxide.

(22) Multi-functional cement dispersant comprising salt (P-22) of graft copolymer obtained by the first step and the second step of aforementioned Embodiment (11) and the third step described below:

The third step: Step of obtaining salt (P-22) of copolymer by partially neutralizing graft copolymer (P-11) obtained in the second step with sodium hydroxide.

(23) Multi-functional cement dispersant comprising salt (P-23) of graft copolymer obtained by the first step and the second step of aforementioned Embodiment (17) and the third step described below:

The third step: Step of obtaining salt (P-23) of copolymer by partially neutralizing graft copolymer (P-17) obtained in the second step with sodium hydroxide.

The following is mentioned as an embodiment of hydraulic cement composition according to this invention:

(24) Concrete containing cement by 326 kg/m$^3$, fine aggregates by 862 kg/m$^3$, coarse aggregates by 951 kg/m$^3$ and water 163 kg/m$^3$ and also containing any one of the multi-functional cement dispersant (1)–(23) described above in an amount of 0.05–4.0 weight parts per 100 weight parts of cement.

In what follows, the invention will be described by way of the results of test examples but it goes without saying that the invention is not limited to these examples. In the following, "parts" will mean "weight parts" and "%" will mean "weight %" unless specifically described to be otherwise.

EXAMPLES

Part 1: Synthesis of Graft Copolymers

Test Example 1

Synthesis of Graft Copolymer (P-1)

After maleic anhydride 186 g (1.9 moles) and α-allyl-ω-acetyl-polyoxyethylene (n=30) 1432 g (1.0 mole) were placed inside a reactor and dissolved uniformly with stirring, the atmosphere was replaced with nitrogen. A reaction was then started by adding azobis isobutylonitrile 4 g while the temperature of the reacting system was kept at 80° C. by means of a temperature bath. After the reaction was started, azobis isobutylonitrile 8 g was further added by portions and the radical polymerization reaction was continued for 6 hours until it was concluded. The copolymerized substance thus obtained was analyzed and found to be copolymer (P-1) with average numerical molecular weight of 13000 containing maleic acid and α-allyl-ω-acetyl-polyoxyethylene (n=30) at molar ratio of 65/35 as converted to original materials. Next, this copolymerized substance 100 parts was placed inside a reactor vessel together with 16 parts of polyoxyalkylene monoalkylester with block addition of ethylene oxide 2 moles and propylene oxide 2 moles to 1 mole of butyric acid and 6 parts of tributylamine as catalyst and the atmosphere was replaced with nitrogen gas. An esterification reaction was carried out with stirring for 4 hours at 100° C. to obtain graft copolymer (P-1). The viscosity of 40% aqueous solution of this graft copolymer (P-1) at 20° C. was 92 MPa·s.

Test Examples 2–18 and Comparison Examples 1–15

Synthesis of Graft Copolymers (P-2)–(P-18) and (R-1)–(R-15)

Graft copolymers (P-2)–(P-18) and (R-1)–(R-15) were similarly obtained.

Test Example 19

Preparation of Salt (P-19) of Graft Copolymer

Graft copolymer (P-1) obtained in Test Example 1 100 parts was dissolved in water 148 parts to obtain an aqueous solution to which a 20% aqueous solution of sodium hydroxide 6.1 parts was gradually added with stirring to partially neutralize graft copolymer (P-1) to prepare salt (P-19) of graft copolymer.

Test Examples 20–23

Preparation of Salts (P-20)–(P-23) of Graft Copolymer

Salt (P-20) of graft copolymer was prepared from graft copolymer (P-3) obtained in Test Example 3, salt (P-21) of graft copolymer was prepared from graft copolymer (P-6) obtained in Test Example 6, salt (P-22) of graft copolymer was prepared from graft copolymer (P-11) obtained in Test Example 11, and salt (P-23) of graft copolymer was prepared from graft copolymer (P-17) obtained in Test Example 17, as salt (P-11) was obtained. The graft copolymers and salts of graft copolymers thus prepared are summarized in Table 1.

TABLE 1

| | Kind of Graft Copolymer, etc. | Copolymer in First Step | | | | Copolymer in second step | | |
|---|---|---|---|---|---|---|---|---|
| | | Copolymerization ratio (molar %) | | | | | | |
| | | Maleic anhydride Molar % | Monomer of Formula 1 Kind/ Molar % | Other Monomers Kind/ Molar % | Average numerical molecular weight | *1 | *2 | *3 |
| Test Example | | | | | | | | |
| 1 | P-1 | 65 | B-1/35 | | 13000 | D-1 | 16 | 92 |
| 2 | P-2 | 65 | B-1/35 | | 13000 | D-1 | 10 | 108 |
| 3 | P-3 | 70 | B-2/30 | | 18500 | D-1 | 9 | 145 |
| 4 | P-4 | 60 | B-3/40 | | 8200 | D-2 | 24 | 79 |
| 5 | P-5 | 65 | B-4/35 | | 12700 | D-2 | 10 | 104 |
| 6 | P-6 | 57 | B-2/38 | C-1/5 | 23000 | D-2 | 12 | 243 |
| 7 | P-7 | 58 | B-1/37 | C-1/5 | 19500 | D-1 | 9 | 207 |
| 8 | P-8 | 65 | B-3/30 | C-1/5 | 9000 | D-1 | 18 | 175 |
| 9 | P-9 | 65 | B-5/35 | | 13000 | D-3 | 14 | 113 |
| 10 | P-10 | 68 | B-6/32 | | 13000 | D-3 | 7 | 138 |
| 11 | P-11 | 65 | B-1/35 | | 13000 | D-4 | 14 | 230 |
| 12 | P-12 | 65 | B-1/35 | | 13000 | D-4 | 20 | 385 |
| 13 | P-13 | 65 | B-1/35 | | 13000 | D-4 | 7 | 197 |
| 14 | P-14 | 60 | B-3/40 | | 8200 | D-5 | 12 | 174 |
| 15 | P-15 | 70 | B-7/30 | | 12400 | D-6 | 10 | 323 |
| 16 | P-16 | 65 | B-4/35 | | 19600 | D-4 | 23 | 462 |
| 17 | P-17 | 55 | B-5/45 | | 22300 | D-4 | 9 | 265 |
| 18 | P-18 | 60 | B-1/35 | C-1/5 | 28500 | D-4 | 18 | 537 |
| 19 | P-19 | 65 | B-1/35 | | 13000 | D-1 | 16 | 127 |
| 20 | P-20 | 70 | B-2/30 | | 18500 | D-1 | 9 | 172 |
| 21 | P-21 | 57 | B-2/38 | C-1/5 | 23000 | D-2 | 12 | 385 |
| 22 | P-22 | 65 | B-1/35 | | 13000 | D-4 | 14 | 258 |
| 23 | P-23 | 55 | B-5/45 | | 22300 | D-4 | 9 | 293 |
| Comparison Example | | | | | | | | |
| 1 | R-1 | 65 | B-1/35 | | 13000 | D-1 | 2 | 110 |
| 2 | R-2 | 65 | B-1/35 | | 13000 | D-1 | 40 | 95 |
| 3 | R-3 | 60 | B-2/40 | | 20100 | DR-1 | 10 | 232 |
| 4 | R-4 | 70 | B-4/30 | | 18000 | DR-2 | 20 | 154 |
| 5 | R-5 | 60 | B-3/35 | C-1/5 | 15000 | DR-3 | 15 | 175 |
| 6 | R-6 | 45 | B-5/55 | | 11600 | D-2 | 12 | 137 |
| 7 | R-7 | 60 | BR-1/40 | | 22500 | D-1 | 5 | 316 |

TABLE 1-continued

Copolymer in First Step

Copolymerization ratio (molar %)

| Kind of Graft Copolymer, etc. | Maleic anhydride Molar % | Monomer of Formula 1 Kind/ Molar % | Other Monomers Kind/ Molar % | Average numerical molecular weight | Copolymer in second step *1 | *2 | *3 |
|---|---|---|---|---|---|---|---|
| 8 | R-8 | 65 | B-1/35 | | 13000 | — | — | 118 |
| 9 | R-9 | 65 | B-1/35 | | 13000 | D-4 | 2 | 141 |
| 10 | R-10 | 65 | B-1/35 | | 13000 | D-4 | 40 | 1650 |
| 11 | R-11 | 60 | B-3/40 | | 8200 | DR-4 | 15 | 215 |
| 12 | R-12 | 70 | B-7/30 | | 12400 | DR-5 | 10 | 138 |
| 13 | R-13 | 65 | B-1/35 | | 13000 | DR-6 | 14 | *4 |
| 14 | R-14 | 45 | B-4/55 | | 21000 | D-5 | 15 | 365 |
| 15 | R-15 | 60 | B-5/35 | C-1/5 | 19500 | D-6 | 2 | 165 |

In TABLE 1:
*1: Kind of polyoxyalkylene monoalkylester, polyoxyalkylene monoalkylether or polypropyleneglycol;
*2: Part of polyoxyalkylene monoalkylester, polyoxyalkylene monoalkylether or polypropyleneglycol reacted with 100 parts of copolymer obtained in the first step;
*3: Viscosity (in MPa · s) at 20° C. of 40% aqueous solution of graft copolymer obtained in the second step;
*4: No measurement was taken because it gelled and no graft copolymer was obtained;
P-19: Sodium salt of P-1;
P-20: Sodium salt of P-3;
P-21: Sodium salt of P-6;
P-22: Sodium salt of P-11
P-23: Sodium salt of P-17
B-1: α-allyl-ω-acetyl-polyoxyethylene (n = 30);
B-2: α-allyl-ω-acetyl-polyoxyethylene (n = 50);
B-3: α-allyl-ω-acetyl-polyoxyethylene (n = 17);
B-4: α-allyl-ω-lauroyl-polyoxyethylene (n = 60);
B-5: α-allyl-ω-methyl-polyoxyethylene (n = 35);
B-6: α-allyl-ω-hydroxy-polyoxyethylene (n = 60) polyoxypropylene (m = 5);
B-7: α-allyl-ω-acetyl-polyoxyethylene (n = 50) polyoxypropylene (m = 5);
BR-1: α-allyl-ω-methyl-polyoxyethylene (n = 95);
C-1: Styrene:
D-1: α-butyroyl-ω-hydroxy-dioxyethylene dioxypropylene;
D-2: α-propionoyl-ω-hydroxy-dioxyethylene trioxypropylene;
D-3: α-butyl-ω-hydroxy-dioxyethylene dioxypropylene;
D-4: Polypropyleneglycol (m = 7);
D-5: Polypropyleneglycol (m = 10);
D-6: Polypropyleneglycol (m = 4);
DR-1: α-lauroyl-ω-hydroxy-polyoxyethylene (n = 5) polyoxypropylene (m = 2);
DR-2: α-butyloyl-ω-hydroxy-polyoxyethylene (n = 4);
DR-3: α-octyl-ω-hydroxy-polyoxyethylene (n = 5);
DR-4: Polypropyleneglycol (m = 18)
DR-5: Dipropyleneglycol;
DR-6: Polyethylenglycol (n = 7).

Part 2 (Preparation and Evaluation of Concrete)

Preparation of Concrete

Concrete samples to be tested were prepared as follows under the conditions shown in Table 2. Normal portland cement (specific weight=3.16; braine value=3300), fine aggregates (Ooi-gawa River sand with specific weight=2.63) and coarse aggregates (crushed stones from Okazaki with specific weight=2.66) were sequentially added into a pan-type forced kneading mixer with capacity 50 liters and subjected to a free kneading process for 15 seconds. Next, a multi-functional cement dispersant comprising graft copolymer or salt of graft copolymer synthesized or prepared in Part 1 was added and kneaded together such that the slump would be within a target range of 18±1 cm and the air content within a target range of 4.5±1% and an agent for controlling air content was added with water with kneading for 90 seconds.

TABLE 2

| Water/ cement ratio (%) | Ratio of fine aggregates (%) | Unit amount (kg/m³) | | | |
|---|---|---|---|---|---|
| | | Water | Cement | Fine aggregates | Coarse aggregates |
| 50 | 49 | 163 | 326 | 862 | 951 |

Evaluation of Concrete Samples

For each of the tested concrete samples, the air content, slump, slump loss, dry shrinkage, index of resistance against freezing and thawing and compression strength were obtained as explained below. The beginning and end of setting were also obtained. These results are summarized below in Tables 3 and 4.

Air content: After the tiltable mixer containing the sample concrete is rotated for 60 or 90 minutes at the rotary speed of 2 rpm, like that of a container for ready-mixed concrete, the concrete was discharged into a mixing container and measured according to JIS-A1128 (Japanese Industrial Standard).

Slump: Measured according to JIS-A1101 at the same time as the measurement of the air content.

Slump loss: Calculated as the percentage of the slump after 90 minutes with respect to the slump immediately afterward.

Dry shrinkage: Calculated by storing each sample under the condition of 20° C. and 60% RH and measuring the sample at ages of 13 weeks and 26 weeks by a comparator method according to JIS-A1129. The smaller the number, the smaller the dry shrinkage.

Index of resistance against freezing and thawing: Obtained by measurement according to Supplement 2 of JIS-A1129 and presented as durability index according to ASTM-C666-75. The maximum value of the index is 100. The closer the index to 100, the better is the resistance against freezing and thawing.

Compressive Strength: Measured at ages 3 days and 28 days according to JIS-A1108.

TABLE 3

| | Graft Co-polymer, etc. | | Immediately after (t = 0) | | After 60 minutes (t = 60) | | After 90 minutes (t = 90) | | Slump Loss |
|---|---|---|---|---|---|---|---|---|---|
| | Kind | Amt | Slump (cm) | Air (%) | Slump (cm) | Air (%) | Slump (cm) | Air (%) | (%) |
| Test Example | | | | | | | | | |
| 24 | P-1 | 0.16 | 18.5 | 4.7 | 17.7 | 4.5 | 17.1 | 4.4 | 92.4 |
| 25 | P-2 | 0.17 | 18.2 | 4.5 | 17.5 | 4.4 | 16.8 | 4.2 | 92.3 |
| 26 | P-3 | 0.20 | 18.6 | 4.5 | 18.0 | 4.5 | 17.5 | 4.6 | 94.1 |
| 27 | P-4 | 0.17 | 18.6 | 4.6 | 17.4 | 4.5 | 17.0 | 4.5 | 91.4 |
| 28 | P-5 | 0.15 | 18.5 | 4.4 | 17.2 | 4.3 | 17.0 | 4.3 | 91.9 |
| 29 | P-6 | 0.20 | 18.3 | 4.6 | 18.5 | 4.6 | 18.0 | 4.5 | 98.4 |
| 30 | P-7 | 0.21 | 18.4 | 4.6 | 18.0 | 4.6 | 17.7 | 4.7 | 96.2 |
| 31 | P-8 | 0.19 | 18.4 | 4.4 | 18.2 | 4.3 | 17.9 | 4.3 | 97.2 |
| 32 | P-9 | 0.20 | 18.6 | 4.6 | 17.6 | 4.5 | 16.7 | 4.3 | 89.8 |
| 33 | P-10 | 0.23 | 18.7 | 4.5 | 17.4 | 4.6 | 16.5 | 4.2 | 88.2 |
| 34 | P-11 | 0.21 | 18.6 | 4.6 | 17.7 | 4.4 | 17.2 | 4.3 | 92.5 |
| 35 | P-12 | 0.24 | 18.4 | 4.5 | 18.5 | 4.5 | 17.9 | 4.4 | 97.3 |
| 36 | P-13 | 0.19 | 18.7 | 4.6 | 17.3 | 4.6 | 16.9 | 4.5 | 90.4 |
| 37 | P-14 | 0.23 | 18.5 | 4.5 | 17.7 | 4.3 | 17.2 | 4.3 | 93.0 |
| 38 | P-15 | 0.21 | 18.4 | 4.6 | 18.0 | 4.6 | 17.7 | 4.7 | 96.2 |
| 39 | P-16 | 0.28 | 18.2 | 4.4 | 17.8 | 4.4 | 17.6 | 4.2 | 96.7 |
| 40 | P-17 | 0.23 | 18.6 | 4.6 | 17.3 | 4.5 | 17.2 | 4.4 | 92.5 |
| 41 | P-18 | 0.35 | 18.5 | 4.7 | 18.3 | 4.5 | 17.8 | 4.5 | 96.2 |
| 42 | P-19 | 0.18 | 18.4 | 4.7 | 17.6 | 4.5 | 17.0 | 4.4 | 92.4 |
| 43 | P-20 | 0.21 | 18.5 | 4.5 | 18.1 | 4.5 | 17.4 | 4.6 | 94.1 |
| 44 | P-21 | 0.21 | 18.3 | 4.6 | 18.4 | 4.6 | 17.9 | 4.5 | 97.8 |
| 45 | P-22 | 0.22 | 18.6 | 4.4 | 17.5 | 4.4 | 17.0 | 4.2 | 91.4 |
| 46 | P-23 | 0.24 | 18.4 | 4.6 | 17.7 | 4.5 | 17.2 | 4.4 | 93.5 |
| Comparison Example | | | | | | | | | |
| 16 | R-1 | 0.18 | 18.5 | 4.5 | 14.0 | 4.3 | 10.0 | 4.0 | 54.1 |
| 17 | R-2 | 0.32 | 18.2 | 4.6 | 17.1 | 4.4 | 14.1 | 4.3 | 77.5 |
| 18 | R-3 | 0.26 | 18.7 | 4.4 | 16.5 | 4.6 | 13.3 | 4.8 | 71.1 |
| 19 | R-4 | 0.25 | 18.4 | 4.4 | 16.3 | 4.5 | 13.0 | 4.7 | 70.7 |
| 20 | R-5 | 0.29 | 18.6 | 4.7 | 15.6 | 4.4 | 12.4 | 4.4 | 66.7 |
| 21 | R-6 | 0.38 | 18.3 | 4.6 | 15.8 | 4.4 | 12.7 | 4.3 | 69.4 |
| 22 | R-7 | 0.30 | 18.7 | 4.4 | 17.0 | 4.3 | 14.2 | 4.5 | 75.9 |
| 23 | R-8 | 0.18 | 18.7 | 4.7 | 14.2 | 4.3 | 10.4 | 4.1 | 55.6 |
| 24 | R-9 | 0.19 | 18.3 | 4.4 | 15.3 | 4.2 | 11.5 | 4.0 | 62.8 |
| 25 | R-10 | 0.64 | 18.0 | 4.3 | 12.5 | 4.3 | 9.5 | 4.2 | 52.7 |
| 26 | R-11 | 0.23 | 18.2 | 4.5 | 15.8 | 4.4 | 11.8 | 4.2 | 64.8 |
| 27 | R-12 | 0.20 | 18.6 | 4.4 | 14.9 | 4.2 | 10.6 | 4.0 | 57.0 |
| 28 | R-14 | 0.32 | 18.3 | 4.6 | 15.0 | 4.4 | 12.4 | 4.3 | 67.8 |
| 29 | R-15 | 0.28 | 18.6 | 4.5 | 15.0 | 4.3 | 11.3 | 4.1 | 60.7 |
| 30 | *5 | 0.20 | 18.6 | 4.5 | 15.2 | 4.2 | 11.9 | 4.1 | 64.0 |

In TABLE 3:
Amt: Added amount converted to solid component against 100 parts of cement;
*5; Polycarboxylic acid cement dispersant (CHUPOL HP-11 produced by Takemoto Yushi Kabushiki Kaisha)

TABLE 4

| | Setting (minute) | | Dry Shrinkage Ratio (× 10⁻⁴) | | Freezing and Thawing | Compressive Strength (N/mm²) | |
|---|---|---|---|---|---|---|---|
| | | | Material Age | Material Age | Resistance Index | Material Age | Material Age |
| | Start | End | 13 weeks | 26 weeks | (300 cycles) | 3 Days | 28 Days |

Test Example

| | | | | | | | |
|---|---|---|---|---|---|---|---|
| 24 | 385 | 520 | 5.8 | 6.6 | 95.5 | 8.4 | 44.5 |
| 25 | 400 | 535 | 5.9 | 6.6 | 94.0 | 8.3 | 43.8 |
| 26 | 360 | 480 | 6.0 | 6.9 | 97.0 | 8.6 | 44.3 |
| 27 | 415 | 550 | 5.6 | 6.3 | 92.2 | 7.9 | 44.9 |
| 28 | 350 | 475 | 5.7 | 6.6 | 93.4 | 8.8 | 44.5 |
| 29 | 405 | 550 | 5.9 | 6.7 | 94.2 | 8.4 | 44.2 |
| 30 | 370 | 550 | 5.8 | 6.6 | 94.8 | 8.8 | 44.2 |
| 31 | 420 | 510 | 6.1 | 6.7 | 94.1 | 8.2 | 44.8 |
| 32 | 410 | 550 | 6.0 | 7.0 | 90.8 | 7.8 | 44.3 |
| 33 | 430 | 565 | 6.0 | 7.2 | 91.0 | 8.0 | 44.0 |
| 34 | 390 | 530 | 5.7 | 6.5 | 93.0 | 8.2 | 44.2 |
| 35 | 410 | 540 | 5.5 | 6.4 | 91.3 | 7.9 | 44.0 |
| 36 | 370 | 485 | 6.0 | 6.9 | 95.5 | 8.5 | 44.5 |
| 37 | 430 | 565 | 5.9 | 6.8 | 92.0 | 7.2 | 43.1 |
| 38 | 365 | 490 | 5.6 | 6.6 | 96.2 | 8.4 | 44.3 |
| 39 | 360 | 485 | 5.7 | 6.7 | 92.4 | 8.5 | 44.5 |
| 40 | 400 | 536 | 5.8 | 6.9 | 92.0 | 8.2 | 44.3 |
| 41 | 440 | 590 | 6.1 | 7.2 | 90.5 | 7.1 | 43.7 |
| 42 | 386 | 521 | 5.8 | 6.5 | 95.6 | 8.4 | 44.5 |
| 43 | 360 | 480 | 6.1 | 6.8 | 96.8 | 8.7 | 44.3 |
| 44 | 402 | 549 | 5.9 | 6.7 | 94.1 | 8.4 | 44.3 |
| 45 | 405 | 540 | 5.6 | 6.5 | 93.6 | 8.6 | 44.8 |
| 46 | 410 | 540 | 5.9 | 7.0 | 94.0 | 8.0 | 44.0 |

Comparison Example

| | | | | | | | |
|---|---|---|---|---|---|---|---|
| 16 | 450 | 610 | 7.3 | 8.5 | 63.5 | 4.2 | 42.0 |
| 17 | 435 | 570 | 6.1 | 7.2 | 55.6 | 7.7 | 43.5 |
| 18 | 415 | 550 | 7.1 | 8.0 | 57.5 | 7.5 | 43.2 |
| 19 | 440 | 590 | 7.2 | 8.4 | 30.0 | 5.8 | 43.0 |
| 20 | 480 | 650 | 7.0 | 8.2 | 49.0 | 3.1 | 42.5 |
| 21 | 460 | 625 | 7.2 | 8.3 | 65.5 | 4.0 | 42.6 |
| 22 | 445 | 580 | 7.3 | 8.6 | 61.5 | 6.0 | 43.1 |
| 23 | 480 | 660 | 7.6 | 8.8 | 68.5 | 3.0 | 41.5 |
| 24 | 455 | 615 | 7.3 | 8.5 | 64.0 | 4.3 | 42.3 |
| 25 | 670 | 780 | 6.2 | 7.2 | 35.0 | 2.1 | 37.7 |
| 26 | 420 | 560 | 7.0 | 8.1 | 70.3 | 7.3 | 42.8 |
| 27 | 415 | 545 | 6.7 | 7.6 | 48.0 | 7.5 | 43.0 |
| 28 | 470 | 650 | 6.3 | 7.2 | 55.5 | 3.4 | 42.0 |
| 29 | 440 | 605 | 6.6 | 7.5 | 63.0 | 4.0 | 42.2 |
| 30 | 380 | 510 | 7.1 | 8.0 | 82.0 | 8.3 | 43.6 |

As should be clear from the description given above, cement dispersants according to this invention can provide hydraulic cement compositions with superior fluidity with a reduced loss with the time and hardened objects produced from such hydraulic cement compositions exhibit a superior early strength, a low dry shrinkage and a high resistance against freezing and thawing.

What is claimed is:

1. A multi-functional cement dispersant comprising graft copolymers obtained by;
   a first step of obtaining copolymers with average numerical molecular weight 3000–50000 by radical polymerization of a mixture of radical polymerizable monomers containing maleic anhydride and monomers of form given by Formula 1 below, together in an amount of 85 molar % or more of said mixture and at molar ratio of 50/50–80/20; and
   a second step of obtaining said graft copolymers by a graft reaction, in the presence of a basic catalyst, of 100 weight parts of said copolymers obtained in said first step and 3–35 weight parts of one or more selected from the group consisting of polyoxyalkylene monoalkylester, polyoxyalkylene monoalkylether and polypropylenglycol with repetition number of oxypropylene units equal to 3–15;

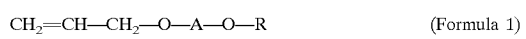
$$CH_2=CH-CH_2-O-A-O-R \qquad \text{(Formula 1)}$$

where R is acyl group with 1–18 carbon atoms, alkyl group with 1–3 carbon atoms or hydrogen, and A is a residual group obtained by removing all hydroxyl groups from polyalkylene glycol with repetition number of oxyalkylene units equal to 5–80, said oxyalkylene units consisting only of oxyethylene units or of both oxyethylene units and oxypropylene units;

where said polyoxyalkylene monoalkylester has a block addition of a total of 2–10 moles of ethylene oxide and propylene oxide to one mole of aliphatic carboxylic acid with 1–6 carbon atoms; and where said polyoxyalkylene monoalkylether has a block addition of a total of 2–10 moles of ethylene oxide and propylene oxide to one mole of aliphatic alcohol with 1–6 carbon atoms.

2. A multi-functional cement dispersant comprising salts of graft copolymers obtained by:

a first step of obtaining copolymers with average numerical molecular weight 3000–50000 by radical polymerization of a mixture of radical polymerizable monomers containing maleic anhydride and monomers of form given by Formula 1 below, together in an amount of 85 weight % or more of said mixture and at molar ratio of 50/50–80/20;

a second step of obtaining graft copolymers by a graft reaction, in the presence of a basic catalyst, of 100 weight parts of said copolymers obtained in said first step and 3–35 weight parts of one or more selected from the group consisting of polyoxyalkylene monoalkylester, polyoxyalkylene monoalkylether and polypropyleneglycol with repetition number of oxypropylene units equal to 3–15; and a third step of obtaining said salts of graft copolymers by neutralizing said graft copolymers obtained in said second step with one or more selected from the group consisting of alkali metal hydroxide, alkali earth metal hydroxide and amines;

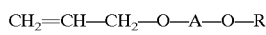 (Formula 1)

where R is acyl group with 1–18 carbon atoms, alkyl group with 1–3 carbon atoms or hydrogen, and A is a residual group obtained by removing all hydroxyl groups from polyalkylene glycol with repetition number of oxyalkylene units equal to 5–80, said oxyalkylene units consisting only of oxyethylene units or of both oxyethylene units and oxypropylene units;

where said polyoxyalkylene monoalkylester has a block addition of a total of 2–10 moles of ethylene oxide and propylene oxide to one mole of aliphatic carboxylic acid with 1–6 carbon atoms; and where said polyoxyalkylene monoalkylether has a block addition of a total of 2–10 moles of ethylene oxide and propylene oxide to one mole of aliphatic alcohol with 1–6 carbon atoms.

3. The multi-functional cement dispersant of claim 1 wherein copolymers with average numerical molecular weight 5000–25000 are obtained in said first step by radical polymerization of said mixture of radical polymerizable monomers without using any solvent.

4. The multi-functional cement dispersant of claim 2 wherein copolymers with average numerical molecular weight 5000–25000 are obtained in said first step by radical polymerization of said mixture of radical polymerizable monomers without using any solvent.

5. The multi-functional cement dispersant of claim 3 wherein said mixture of radical polymerizable monomers of said first step comprises maleic anhydride and monomers of Formula 1, totaling together 90 molar % or more, at molar ratio of 60/40–70/30.

6. The multi-functional cement dispersant of claim 4 wherein said mixture of radical polymerizable monomers of said first step comprises maleic anhydride and monomers of Formula 1, totaling together 90 molar % or more, at molar ratio of 60/40–70/30.

7. The multi-functional cement dispersant of claim 3 wherein said mixture of radical polymerizable monomers of said first step comprises maleic anhydride and monomers of Formula 1 and also contains styrene in an amount of 10 molar % or less.

8. The multi-functional cement dispersant of claim 4 wherein said mixture of radical polymerizable monomers of said first step comprises maleic anhydride and monomers of Formula 1 and also contains styrene in an amount of 10 molar % or less.

9. The multi-functional cement dispersant of claim 3 wherein R of Formula 1 is acyl group with 1–18 carbon atoms, A is a residual group obtained by removing all hydroxyl groups from polyoxyethylene glycol with repetition number of oxyethylene units 15–70.

10. The multi-functional cement dispersant of claim 4 wherein R of Formula 1 is acyl group with 1–18 carbon atoms, A is a residual group obtained by removing all hydroxyl groups from polyoxyethylene glycol with repetition number of oxyethylene units 15–70.

11. The multi-functional cement dispersant of claim 3 wherein said second step is for obtaining said graft copolymers by a graft reaction of 5–25 weight parts of one or more selected from the group consisting of polyoxyalkylene monoalkylester, polyoxyalkylene monoalkylether and polypropyleneglycol to 100 weight parts of the copolymer obtained in said first step.

12. The multi-functional cement dispersant of claim 4 wherein said second step is for obtaining said graft copolymers by a graft reaction of 5–25 weight parts of one or more selected from the group consisting of polyoxyalkylene monoalkylester, polyoxyalkylene monoalkylether and polypropyleneglycol to 100 weight parts of the copolymer obtained in said first step.

13. The multi-functional cement dispersant of claim 11 wherein the polyoxyalkylene monoalkylester of said second step has a block addition of 1–4 moles of ethylene oxide and 1–4 moles of propylene oxide per one mole of aliphatic carboxylic acid with 1–6 carbon atoms.

14. The multi-functional cement dispersant of claim 12 wherein the polyoxyalkylene monoalkylester of said second step has a block addition of 1–4 moles of ethylene oxide and 1–4 moles of propylene oxide per one mole of aliphatic carboxylic acid with 1–6 carbon atoms.

15. The multi-functional cement dispersant of claim 11 wherein the polyoxyalkylene monoalkylether of said second step has a block addition of 1–4 moles of ethylene oxide and 1–4 moles of propylene oxide per one mole of aliphatic alcohol with 3–5 carbon atoms.

16. The multi-functional cement dispersant of claim 12 wherein the polyoxyalkylene monoalkylether of said second step has a block addition of 1–4 moles of ethylene oxide and 1–4 moles of propylene oxide per one mole of aliphatic alcohol with 3–5 carbon atoms.

17. The multi-functional cement dispersant of claim 11 wherein the polypropyleneglycol of said second step has a repetition number of oxypropylene units equal to 4–10.

18. The multi-functional cement dispersant of claim 12 wherein the polypropyleneglycol of said second step has a repetition number of oxypropylene units equal to 4–10.

19. The multi-functional cement dispersant of claim 11 wherein the basic catalyst of said second step is an amine catalyst.

20. The multi-functional cement dispersant of claim 12 wherein the basic catalyst of said second step is an amine catalyst.

21. The multi-functional cement dispersant of claim 11 wherein 40 weight % aqueous solution of said graft copolymers obtained in said second step has viscosity 60–700 MPa·s at 20° C.

22. The multi-functional cement dispersant of claim 12 wherein 40 weight % aqueous solution of said graft copolymers obtained in said second step has viscosity 60–700 MPa·s at 20° C.

23. A hydraulic cement composition comprising 0.05–4.0 weight parts of a multi-functional cement dispersant of claim 1 per 100 weight parts of cement.

24. A hydraulic cement composition comprising 0.05–4.0 weight parts of a multi-functional cement dispersant of claim 2 per 100 weight parts of cement.

25. A hydraulic cement composition comprising 0.05–4.0 weight parts of a multi-functional cement dispersant of claim 3 per 100 weight parts of cement.

26. A hydraulic cement composition comprising 0.05–4.0 weight parts of a multi-functional cement dispersant of claim 4 per 100 weight parts of cement.

27. A hydraulic cement composition comprising 0.05–4.0 weight parts of a multi-functional cement dispersant of claim 11 per 100 weight parts of cement.

28. A hydraulic cement composition comprising 0.05–4.0 weight parts of a multi-functional cement dispersant of claim 12 per 100 weight parts of cement.

29. A hydraulic cement composition comprising 0.05–4.0 weight parts of a multi-functional cement dispersant of claim 21 per 100 weight parts of cement.

30. A hydraulic cement composition comprising 0.05–4.0 weight parts of a multi-functional cement dispersant of claim 22 per 100 weight parts of cement.

* * * * *

UNITED STATES PATENT AND TRADEMARK OFFICE
CERTIFICATE OF CORRECTION

PATENT NO.    : 6,642,320 B2
DATED         : November 4, 2003
INVENTOR(S)   : Hiroshi Nakanishi et al.

It is certified that error appears in the above-identified patent and that said Letters Patent is hereby corrected as shown below:

<u>Title page,</u>
Item [30], Foreign Application Priority Data should read
-- July 2, 2001   (JP)     2001-200653
March 27, 2002 (JP)     2002-087683 --

Signed and Sealed this

Twenty-seventh Day of April, 2004

JON W. DUDAS
*Acting Director of the United States Patent and Trademark Office*